(12) United States Patent
Kawashima et al.

(10) Patent No.: US 6,654,245 B2
(45) Date of Patent: Nov. 25, 2003

(54) COOLER FOR ELECTRONIC UNIT AND ELECTRONIC UNIT

(75) Inventors: Nobuyuki Kawashima, Machida (JP); Yohichi Matsui, Komae (JP); Mitsuo Horiuchi, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/113,320

(22) Filed: Mar. 29, 2002

(65) Prior Publication Data

US 2002/0167799 A1 Nov. 14, 2002

(30) Foreign Application Priority Data

Mar. 29, 2001 (JP) .......................................... 2001-094899

(51) Int. Cl.[7] .................................................. H05K 7/20
(52) U.S. Cl. ................. 361/695; 165/80.3; 165/104.33; 165/121; 165/126
(58) Field of Search ........................ 165/80.3, 104.26, 165/104.33, 121–122, 126; 361/687–688, 694–697, 700–703, 715; 454/184

(56) References Cited

U.S. PATENT DOCUMENTS 6,407,921 B1 * 6/2002 Nakamura et al. .......... 361/700
6,408,934 B1 * 6/2002 Ishida et al. ................ 361/700

\* cited by examiner

*Primary Examiner*—Gregory Thompson
(74) *Attorney, Agent, or Firm*—Scott W. Reid; George E. Grosser

(57) ABSTRACT

A CPU cooler is provided for effectively cooling, for example, a CPU chip mounted in a notebook-sized personal computer. An aluminum die casting is equipped with a right portion for covering a CPU package, and a left portion which is coplanar with the right portion and continuous to the right portion, thus forming a fan disposing space. A flat heat pipe is mounted on a bottom surface of the right and left portions and extends linearly. A copper plate is equipped with a first horizontal plate portion for covering the bottom surface of the right portion and the flat heat pipe, and a second horizontal plate portion which faces a second top surface in a height direction and defines the bottom side of a fan disposing space.

8 Claims, 4 Drawing Sheets

[Figure 1]
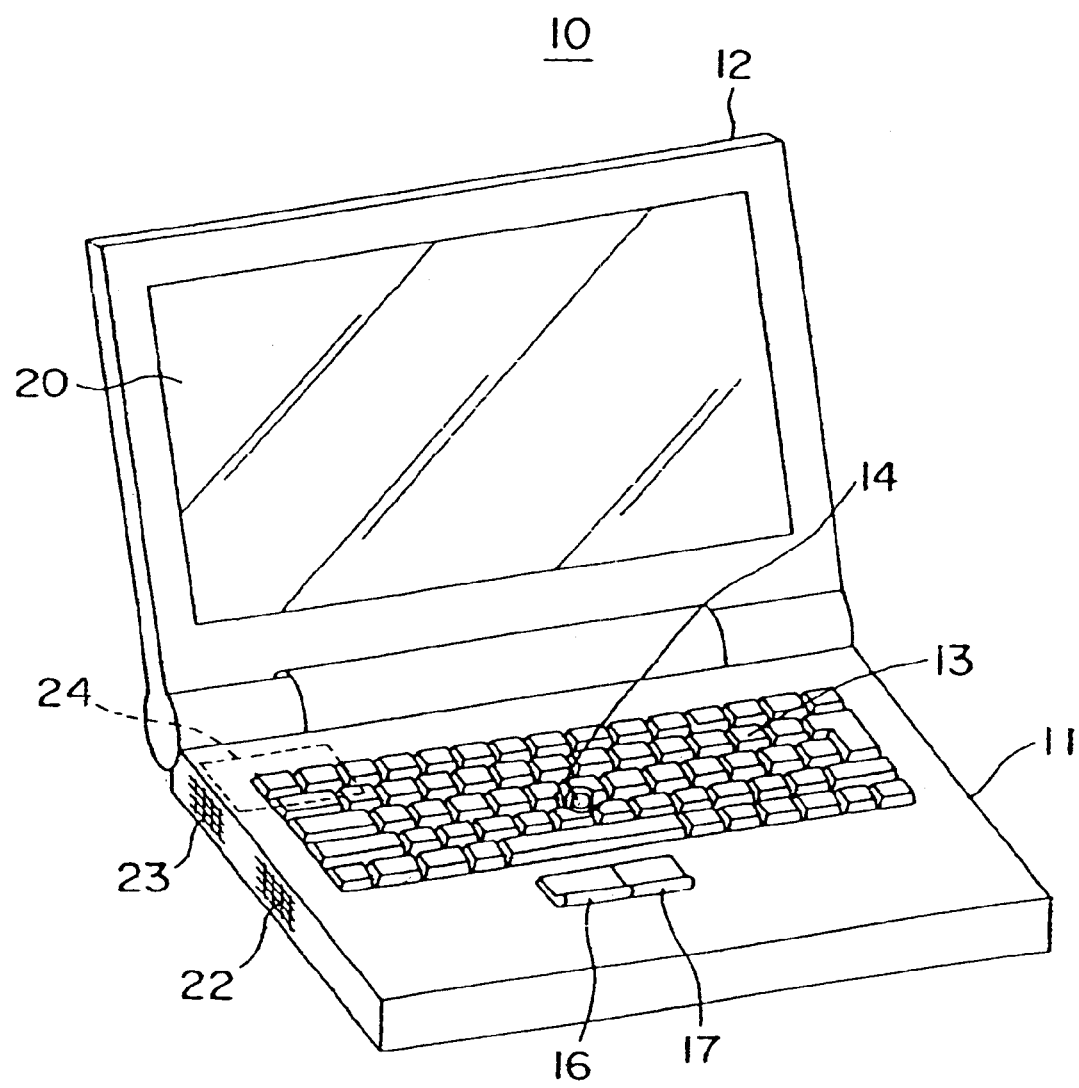

[Figure 2]
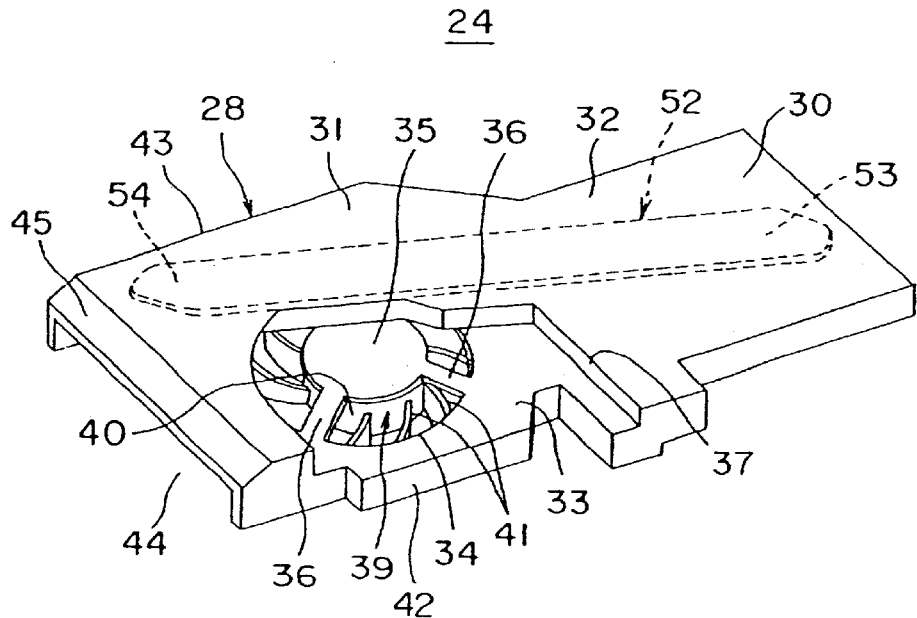
[Figure 3]
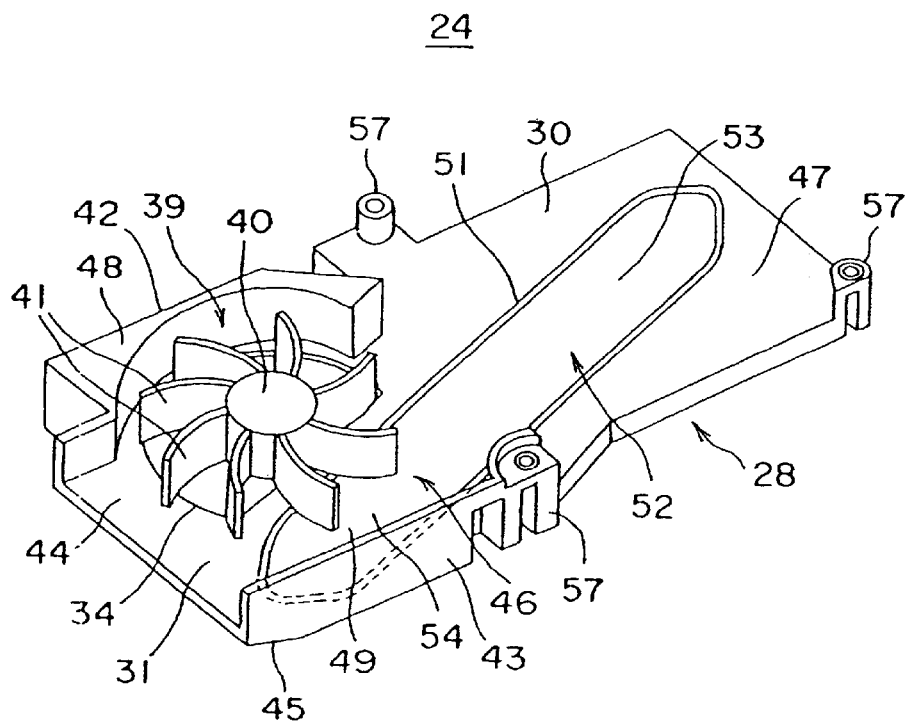

[Figure 4]
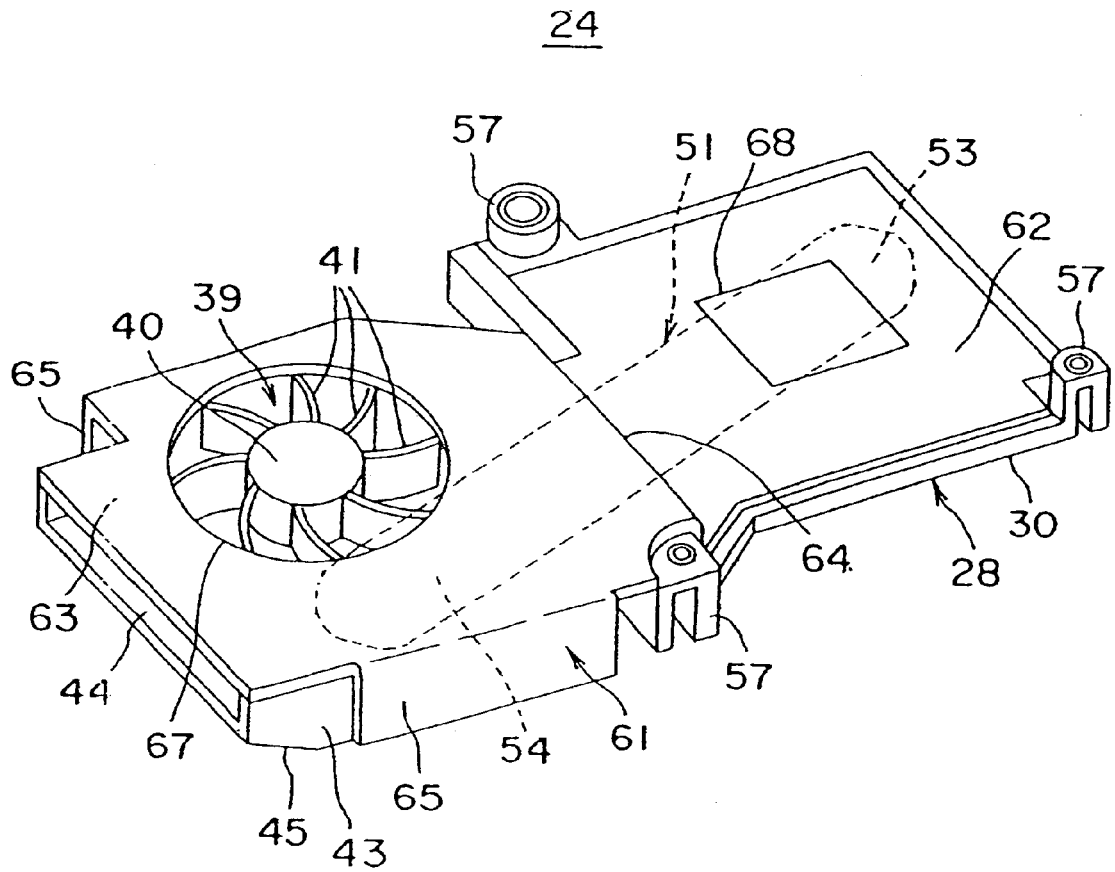
[Figure 5]
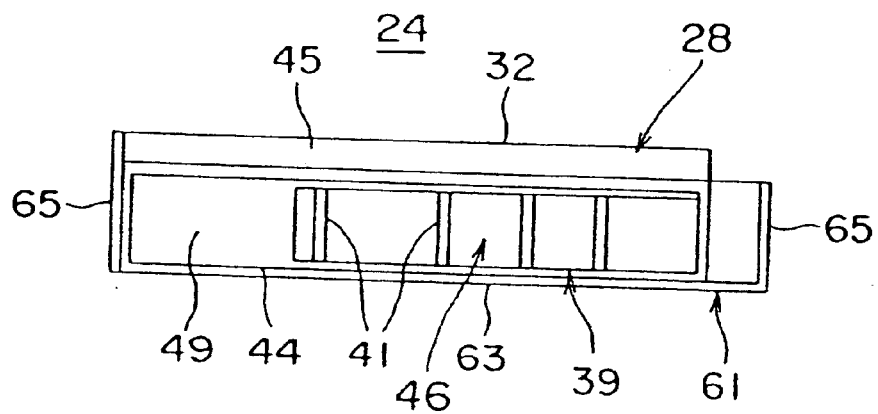

[Figure 6]
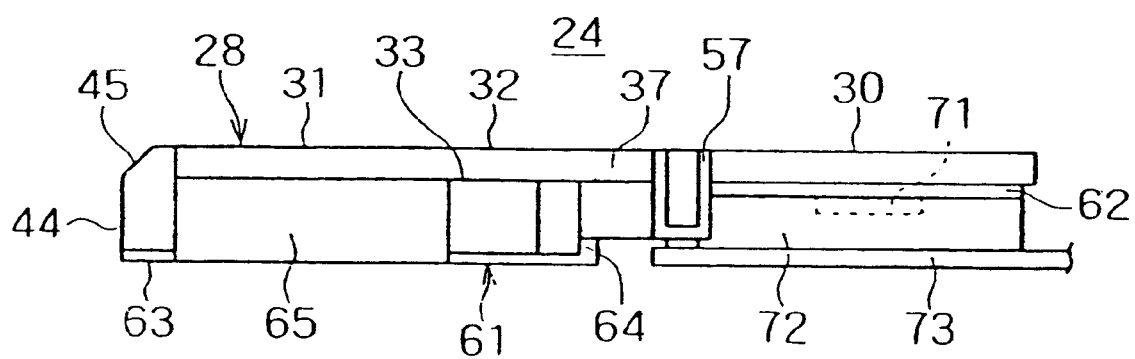

COOLER FOR ELECTRONIC UNIT AND ELECTRONIC UNIT

BACKGROUND OF THE INVENTION

1. Field of the Invention

The present invention relates to a cooler for an electronic unit that is used for cooling a central processing unit (CPU) in a notebook-sized personal computer, and an electronic unit with the cooler, and more particularly to an electronic-unit cooler and an electronic with the cooler in which the cooling performance has been enhanced.

2. Related Art

In notebook-sized personal computers, the amount of heat generated in a CPU increases, as the CPU is operated at a higher speed. For this reason, there has been a demand for cooling of the CPU, and a wide variety of coolers for an electronic unit have been proposed.

The CPU cooler disclosed in Published Unexamined Patent Application No. 2000-323880 utilizes a heat pipe. The heat pipe transfers the heat of a CPU to the entire keyboard and discharges the heat to the outside through the entire keyboard. The heat pipe also transfers the heat to a cooling fan and discharges the heat by forced cooling.

In the CPU cooler disclosed in Published Unexamined Patent Application No. 2000-13065, a CPU and a fan are horizontally disposed adjacent to each other. A heat sink covers the top surfaces of the CPU and the fan, and a heat pipe extends along the side portion of the heat sink. The heat of the CPU is transferred toward the fan through the heat sink and the heat pipe. In this manner, the heat is discharged by forced cooling.

In the CPU cooler disclosed in Published Unexamined Patent Application No. 2000-277964, one portion of a heat sink covers a CPU, and a fan disposing space is provided inside another portion of the heat sink. A heat pipe is attached to the heat sink and extends from the CPU to the air exhaust portion of the fan disposing space and is cooled by a cooling wind within the air exhaust port In the aforementioned CPU of Published Unexamined Patent Application No. 2000-323880, the cooling performance is insufficient, because only the heat pipe transfers the heat of the CPU toward the fan.

In the aforementioned CPU of Published Unexamined Patent Application No. 2000-13065, the heat pipe is curved and extended at right angles along the side portion of the heat sink and transfers heat from the central portion of the heat sink to the radially outer portion through the heat sink. Because of this, the cooling performances of the heat pipe and the heat sink are not high as a whole.

In the aforementioned CPU of Published Unexamined Patent Application No. 2000-277964, cooling of the heat pipe is performed at the outlet port. Because of this, the heat pipe is long in length and the refraction becomes greater. As a result, the heat transfer performance is reduced. In addition, the heat pipe is of a round pipe type and therefore requires a large cooling plate to assure a radiation surface.

It is an object of the present invention to enhance the performances of the heat sink and the heat pipe, in an electronic-unit cooler for discharging the heat of a heat generating body by forced air cooling.

Another object of the invention is to provide an electronic unit equipped with a heat sink and a heat pipe having enhanced performance.

SUMMARY OF THE INVENTION

In accordance with a first embodiment of the present invention, there is provided a cooler for an electronic unit, including:

- a heat sink having (a) a first portion which contacts with a heat generating body directly or through material which efficiently conducts heat, and (b) a second portion defining at least a portion of a fan disposing face;
- a fan disposed in the fan disposing space; and
- a heat pipe mounted on the heat sink (a) in contact with the heat generating body directly or through the material at the first portion and (b) exposed to the fan disposing space at the second portion.

The aforementioned material includes, for example, grease and/or a high heat-conductive metal member described later. The heat generating body is, for example, a semiconductor device. The semiconductor device includes a semiconductor chip (e.g., a CPU chip) and a semiconductor package that houses the semiconductor chip at least partially in the interior thereof. The electronic unit is, for example, a notebook-sized personal computer, a portable electronic unit, etc. The heat sink is constructed, for example, of an aluminum die casting or a copper die casting. The aluminum die casting is inferior in heat conductivity to the copper die casting, but superior in weight reduction to the copper die casting.

Within the heat pipe, the interior liquid is evaporated by the heat of the heat generating body and cools the heat generating body. The vapor is cooled at the portion, on the side of the heat sink, of the heat pipe by the fan cooling air introduced to the interior surface of the heat sink. The vapor is liquefied and returned toward the heat generating body. The heat sink transfers the heat from the heat generating body, toward the fan disposing space and is cooled in the fan disposing space by the cooling wind caused by the fan.

In a conventional electronic-unit cooler, the heat pipe is mounted on the top surface, that is, the surface opposite to the heat generating body and the fan. However, in the present invention, the heat pipe is exposed to the heat generating body side and the fan disposing space side. Therefore, the absorption of heat from the heat generating body by the heat pipe, and radiation in the fan disposing space, are efficiently performed. This enhances the performance of the electronic-unit cooler significantly.

Further according to the present invention, the fan has a plurality of blades which rotate with a vertical direction of the heat sink as its axis of rotation so that air introduced in the vertical direction is discharged in a radial direction as a horizontal direction. The fan and the heat generating body are disposed side by side in a horizontal direction of the heat sink. Also, the first and second portions are continuous to each other and spread substantially horizontally above the heat generating body and the fan. Furthermore, the heat pipe extends substantially horizontally along the bottom surface of the first and second portions.

In the notebook-sized personal computer, for example, there is a demand for weight reduction and thinning of the main body. In the fan, because of the rotating blades, the dimension in the rotation direction dimension is much smaller than the radial dimension. Therefore, the rotation axis of the rotating blades is reduced in the up-and-down direction. As a result, the thickness of an electronic unit that is mounted in the electronic-unit cooler can be suppressed. The first and second portions of the heat sink spread horizontally, and transfer the heat of the heat generating body to the fan disposing space, while suppressing the height of the electronic-unit cooler. The heat pipe also extends horizontally. The horizontal structure of the heat pipe with no step portion smoothens both the movement of the vapor within the heat pipe from the heat generating body toward the fan disposing space, and the return of liquid from the fan disposing space toward the heat generating body. Thus, the heat pipe is capable of greatly enhancing its performance by extending horizontally along the first and second bottom surfaces According to an electronic-unit cooler of a third aspect of the present invention, the second portion has a top surface lower than the top surface of the first portion. Also, the lower top surface has an inlet port communicating with the fan disposing space and also reaches at least one side surface of the heat sink.

In the notebook-sized personal computer, for instance, the thickness of the main body in which an electronic-unit cooler is mounted is small, and the gap between the top wall of the housing of the main body and the top surface of the heat sink is small. If a lower top surface area opening to at least one side surface of the heat sink is formed on the top surface side of the heat sink, and an upper inlet port is formed in the lower top surface area, an air flow passage with a predetermined vertical dimension is assured between the lower top surface area and the top wall of the housing. With this, the air is introduced into the fan disposing space through the upper inlet port without difficulty.

According to an electronic-unit cooler of a fourth aspect of the present invention, the bottom surface, on the side of the first portion, of the heat sink is covered with a high heat-conductive metal member comprising a material whose heat conductivity coefficient is greater than that of the heat sink. In addition, the high heat-conductive metal member forms a fan-disposing-space bottom surface which defines the fan disposing space in cooperation with the second portion.

In the case where the material of the heat sink is, for example, aluminum, material constituting a high heat-conductive metal member and also greater in heat conductivity than the material of the heat sink is, for example, copper. The high heat-conductive metal member is typically a plate metal member.

There are cases where the heat pipe is dried out because of high temperature and stops its function, depending on the heat pipe type. The high heat-conductive metal member can suppress the transfer of heat from the heat generating body to the heat pipe suitably and prevent the heat pipe from drying out, because it is interposed between the heat pipe and the heat generating body. The high heat-conductive metal member forms the fan disposing space in cooperation with the second portion of the heat sink. Therefore, part of the heat of the heat generating body is transferred to the fan disposing space through the high heat-conductive metal member and is cooled in the fan disposing space by the cooling wind produced by the fan.

According to an electronic-unit cooler of a fifth aspect of the present invention, a direction in which the first and second portions are continuous to each other is defined as a first horizontal direction and a horizontal direction perpendicular to the first horizontal direction is defined as a second horizontal direction. With this definition, the fan disposing space has a portion which projects from the fan in the second horizontal direction. The heat pipe extends to the projecting portion.

The bottom surface of the second portion requires a predetermined area in order for the heat pipe to assure a portion that is exposed into the fan disposing space. If the size of the horizontal section of the fan disposing space is made equal to the size of the fan, it will become difficult to assure an installation place for the fan-disposing-space bottom surface portion of the heat pipe, particularly when there is an upper inlet port. If the fan disposing space is equipped with a portion projecting in the radial direction of the fan, the fan-disposing-space bottom surface portion of the heat pipe can be disposed, while avoiding the problem of disposition.

According to an electronic-unit cooler of a sixth aspect of the present invention, the heat pipe is formed into a flat shape in which a horizontal direction perpendicular to an extending direction thereof is a width direction.

The heat absorbing area and radiation area of the heat pipe are increased by adoption of the flat heat pipe. As a result, the heat adsorption performance of the heat pipe from the heat generating body and the radiation performance of the heat pipe in the fan disposing space are enhanced.

According to an electronic-unit cooler of a seventh aspect of the present invention, the heat pipe extends linearly.

As a result of the addition of the projecting portion to the fan disposing space, the heat pipe can extend linearly, while assuring the upper inlet port. In addition, in the heat pipe in the form of a straight line, circulation of vapor and liquid is smooth and therefore the performance of the heat pipe is enhanced.

According to an electronic-unit cooler of an eighth aspect of the present invention, the fan disposing space has an exhaust port at its side portion opposite to the heat generating body through the fan. In addition, the exhaust port has dimensions so that at least a portion of the fan within the fan disposing space is exposed to the exhaust port and that at least a portion of the projecting portion is exposed to the exhaust port.

The air that has cooled the heat pipe and the heat sink is discharged from the exhaust port to the outside of the electronic-unit cooler. Preferably, the housing of the electronic-unit cooler has an air hole corresponding to the exhaust port of the electronic-unit cooler, and the cooling wind is discharged outside the housing through the air hole. Since the exhaust port faces both the fan in the fan disposing space and the projecting portion, the inlet air introduced by the fan cools the heat pipe and heat sink within the fan disposing space and then is discharged effectively from the exhaust port, compared with the structure where the exhaust port faces only the fan.

According to an electronic-unit cooler of a ninth aspect of the present invention, the fan-disposing-space bottom surface of the high heat-conductive metal member has a lower inlet port which communicates with the fan disposing space, right under the fan.

The top side and bottom side of the fan disposing space are defined by the second portion of the heat sink and the fan-disposing-space bottom surface portion of the high heat-conductive metal member, respectively. With this, the second portion of the heat sink and the fan-disposing-space bottom surface portion of the high heat-conductive metal member assure sufficient areas within the fan disposing space, respectively. As a result, the radiation efficiency in the fan disposing space is enhanced.

According to an electronic-unit cooler of a tenth aspect of the present invention, the high heat-conductive metal member has a covering portion which spreads horizontally to cover the first portion, the fan-disposing-space bottom surface portion spreading horizontally at a position lower than the covering portion, and a hanging portion which extends vertically to connect the upper covering portion and the lower fan-disposing-space bottom surface portion together. In addition, the hanging portion defines a side portion, on the side of the heat generating body, of the fan disposing space.

The high heat-conductive metal member is equipped integrally with the heat-generating-body side portion, the fan-disposing-space bottom surface portion, and the hanging portion, and is joined to the heat sink. Therefore, satisfactory cooling performance in the fan disposing space is guaranteed, while satisfactory assembly performance of the electronic-unit cooler is being assured. Because the high heat-conductive metal member also defines the fan disposing space at the hanging portion, the cooling effect of the high heat-conductive metal member in the fan disposing space is increased.

In an electronic unit of an eleventh aspect of the present invention, the electronic-unit cooler is housed in the housing of the electric unit. The housing is provided with a first air-passing portion through which air is passed from outside the housing to inside the housing by an air inhaling force produced with the fan, and a second air-passing portion which faces the exhaust port of the fan disposing space so that exhaust from the fan disposing space is passed from inside the housing to outside the housing.

It is preferable that the first air passing portion of the housing be located in a portion of the housing which faces the inlet port through which air is introduced into the fan disposing space. However, the present invention is not limited to this arrangement. In the case where the electronic unit is a notebook-sized personal computer, the first and second air passing portions are formed in the side wall of the housing of the main body. The air heated to a high temperature because of the heat exchange, within the fan disposing space, between the heat sink and the heat pipe is discharged from the exhaust port of the electronic-unit cooler to the outside of the housing though the second air passing portion of the housing facing the exhaust port immediately. As a result, the heated air is preented from remaining within the housing.

BRIEF DESCRIPTION OF THE DRAWINGS

FIG. 1 is a perspective view showing a notebook-sized personal computer;

FIG. 2 is a perspective view showing a top surface of a aluminum die casting of a CPU cooler mounted in the notebook-sized personal computer shown in FIG. 1;

FIG. 3 is a perspective view showing a bottom surface of the aluminum die casting;

FIG. 4 is a perspective view showing the state in which a copper plate is mounted on the aluminum die casting of FIG. 3;

FIG. 5 is a diagram showing the aluminum die casting taken from a side of an outlet port; and FIG. 6 is a diagram showing the state in which the CPU cooler is assembled to a CPU chip.

DETAILED DESCRIPTION OF A PREFERRED EMBODIMENT

A preferred embodiment of the present invention will be described with reference to the drawings.

FIG. 1 is a perspective view of a notebook-sized personal computer 10. The notebook-sized personal computer 10 has a main body 11 and a cover 12. The cover 12 is joined to the main body 11 and rear edge portion of the main body 11 at its lower edge portion so that it is freely rotatable and which is freely opened and closed on the top surface of the main body 11. In the top surface of the main body 11, there are disposed a keyboard 13, a track point 14 provided in approximately the central portion of the keyboard 13 to move a cursor on the screen of a liquid crystal display 20, and a left click button 16 and a right click button 17 provided in the laterally central portion and in front of the keyboard 13. The liquid crystal display 20 is mounted in the inner surface of the cover 12 and displays an image. In the left side portion of the housing of the main body 11, an inlet port 22 and an exhaust port 23 are provided in longitudinally intermediate portion and the longitudinally rear portion, respectively and communicates the inside of the housing with the outside of the housing. A central processing unit (CPU) cooler 24 is disposed in the rear left portion of the housing of the main body 11.

FIG. 2 is a perspective view showing the top surface of the aluminum die casting 28 of the CPU cooler 24. The CPU cooler 24, in addition to the aluminum die casting 28, is equipped with a copper plate 61 described later (FIG. 4). The aluminum die casting 28 has a right portion 30 and a left portion 31, which are continuous to each other and disposed on the right side and left side. A first top surface 32 consists of a single horizontal surface and is formed over the right portion 30 and left portion 31. The first top surface 32 constitutes the top surfaces of the right portion 30 and left portion 31. A second top surface 33 has a step portion 37 between it and the first top surface 32 and is formed in the left portion 31 as a horizontal surface which is lower than the first top surface 32 by the height of the step portion 37. The front edge of the second top surface 33 is situated at the front side wall of the left portion 31. An inlet port 34 is formed in the second top surface 33 and communicates the top wall of the left portion 31 with the bottom wall of the left portion 31. A fan mounting portion 35 is coplanar with the second top surface 33 and provided in the center of the inlet port 34. The fan mounting portion 35 is connected to the second top surface 33 through a plurality of connection portions 36. A cooling fan 39 has a boss 40 and a plurality of blades 41. The boss 40 is installed on the bottom surface of the fan mounting portion 35 so that it is freely rotatable. The plurality of blades 41 are circumferentially disposed at regular angles with respect to the boss 40 and have their radially inner ends fixed to the boss 40. The plurality of blades 41 also extend from the boss 40 radially outward and rotate integrally with the boss 40. A drive portion for the cooling fan 39 is provided in a portion facing both the fan mounting portion 35 and the boss 40 and drives the boss 40 to rotate with respect to the fan mounting portion 35. The left portion 31, in addition to the top wall, is equipped with a front wall 42 and a rear wall 43, which hang a predetermined length from the front end and rear end of the top wall. The top wall, front wall 42, and rear wall 43 of the left portion 31 define the top side, front side, and rear side of a fan disposing space 46 described later, respectively. The cooling fan 39 is disposed within the fan disposing space 46. An outlet port 44 is formed in the side portion, remote from the right portion 30, of the left portion 31 and is communicated with the fan disposing space 46. The outlet port 44 is aligned with the exhaust port 23 of FIG. 1. An inclined surface portion 45 is formed from the first top surface 32 to the upper edge of the outlet port 44 and is inclined downward toward the outlet port 44. The edge, on the side of the outlet port 44, of the inclined surface portion 45 is even with the second top surface 33.

FIG. 3 is a perspective view showing the top surface of the aluminum die casting 28 of FIG. 2. The bottom surface 47 of the right and left portions 30, 31 forms a single horizontal surface. A bottom-plate joining bottom surface 48 constitutes the bottom surface of the front and rear walls 42, 43 and is joined to the second horizontal plate portion 63 of the copper plate 61 described later. An annular recess 51 has an oblique center line with respect to a line joining the center of the right portion 30 and the center of the cooling fan 39 and is formed in a first bottom surface 47. A flat heat pipe 52 has a thickness equal to the depth of the annular recess 51 and a contour substantially consistent with the contour of the annular recess 51. The flat heat pipe 52 is mounted on the annular recess 51 at some points by caulking. The exposed surface of the flat heat pipe 52 is level with the height of the first bottom surface 47. The portion, on the side of the right portion 30, of the flat heat pipe 52 constitutes a heat absorbing portion 53, while the portion on the side of the left portion 31 constitutes a heat radiating portion 54. The heat radiating portion 54 is shifted radially outward from the center of the cooling fan 39. Three floating-nut burying portions 57 in total are disposed along the circumference of the right portion 30 and project predetermined lengths from the first bottom surface 47. The floating-nut burying portion 57 is well known in the prior art and has, for example, a nut and a compression coil. The nut is prevented from falling out the burying portion 57 by the opposite flange portions and is inserted into the through hole of the burying portion 57 so that it is axially movable. The compression coil spring is inserted onto the intermediate portion of the nut and urges the nut in a direction opposite from a small screw (not shown) meshing with the nut.

FIG. 4 is a perspective view showing the state in which the copper plate 61 is mounted on the aluminum die casting 28 of FIG. 3. The copper plate 61 has a first horizontal plate portion 62 that is joined to the bottom surface of the right portion 30; a second horizontal plate portion 63 that is joined to the bottom-plate joining bottom surface 48 of the front and rear walls 42 (FIG. 3) and 43; and a hanging portion 64 that hangs from the edge, on the side of the second horizontal plate portion 63, of the first horizontal plate portion 62 to connect the first horizontal plate portion 62 and the second horizontal plate portion 63 together. An abutting portion 65 extends vertically from the front and rear edges of the second horizontal plate portion 63 and abuts the exterior surfaces of the front wall 42 (FIG. 3) and the rear wall 43. The copper plate 61 is fixed to the aluminum die casting 28 by means of small screws (not shown). A circular hole 67 has a diameter slightly smaller than the diameter of the cooling fan 39 and also a center aligned with the center of the cooling fan 39. If the cooling fan 39 is driven to rotate, air is introduced from the upstream inlet port 34 and the downstream circular hole 67 into the fan disposing space 46. A square marked line groove 68 is formed in the first horizontal plate portion 62. The annular recess 51 passes through the square marked line groove 68, on the top surface side of the square marked line groove 68.

FIG. 5 is a diagram showing the aluminum die casting 28 taken from the side of the outlet port 44. The outlet port 44 faces the cooling fan 39 and a projecting portion 49 disposed within the fan disposing space 46. With rotation of the cooling fan 39, air is discharged in the radial direction of the cooling fan 39 and discharged to the outlet port 44 through the projecting portion 49.

FIG. 6 illustrates the state in which the CPU cooler 24 is assembled to a CPU chip 71. A CPU package 72 includes the CPU chip 71 provided in the central portion of the top surface, and the top surface of the CPU chip 71 is exposed upward. The top surfaces of the CPU chip 71 and the CPU package 72 are brought into contact with the first horizontal plate portion 62 of the copper plate 61 coated with grease, and the top surface of the CPU chip 71 makes contact with the square marked line groove 68. To obtain a predetermined contacting force between the first horizontal plate portion 62 of the copper plate 61 and the top surfaces of the CPU chip 71 and the CPU package 72, small screws (not shown) penetrate a circuit board 73 and mesh with the floating-nut burying portion 57. This urges the circuit board 73 toward the first horizontal plate portion 62.

During operation of the CPU cooler 24, the cooling fan 39 rotates to introduce the air within the housing of the main body 11 from the inlet port 34 and the circular hole 67 into the fan disposing space 46. On the other hand, the outside air is introduced from the inlet port 22 in the left side portion of the main body 11 into the housing of the main body 11. The introduced air into the fan disposing space 46 cools the interior surface of the fan disposing space 46 and the heat radiating portion 54 and is discharged from the exhaust port 44 to the outlet port 23 and outside of the housing. The CPU chip 71, on the other hand, generates heat upon operation. The generated heat is transmitted to the heat absorbing portion 53 of the flat heat pipe 52 through the first horizontal plate portion 62 of the copper plate 61 and evaporates the liquid within the heat absorbing portion 53. The vapor moves toward the heat radiating portion 54, in which it is cooled by the cooling fan 39 and liquefied. The liquid is moved toward the heat absorbing section 53 by a capillary phenomenon. The first horizontal portion 62 of the copper plate 61 is interposed between the CPU chip 71 and the heat absorbing portion 53 of the flat heat pipe 52 to prevent overheat of the heat absorbing portion 53. This arrangement prevents the flat heat pipe 52 from drying out. Part of the heat in the first horizontal plate portion 62 of the copper plate 61 is transmitted from the hanging portion 64 to the second horizontal plate portion 63. The remaining heat is transmitted from the first horizontal plate portion 62 to the right portion 30 of the aluminum die casting 28, and furthermore, from the right portion 30 to the left portion 31, the front wall 42, and the rear wall 43. The hanging portion 64, the second horizontal plate portion 63, the left portion 31, the front wall 42, and the rear wall 43 are cooled by the cooling wind within the fan disposing space 46, because they are exposed to the fan disposing space 46 as the wall surfaces of the fan disposing space 46. With this, the first horizontal plate portion 62 of the copper plate 61 and the right portion 30 of the aluminum die casting 28 effectively remove heat from the CPU chip 71 and cool the CPU chip 71.

In the CPU cooler 24, the flat heat pipe 52 is disposed not only on the bottom surface of the aluminum die casting 28 but also on the top surface, and the copper plate 61 is omitted. This is named temporally as an old-type CPU cooler. And the cooling performance of the old-type CPU cooler was compared with that of the CPU cooler 24. In the experiment mad on a CPU having a clock frequency of 1 GHz, the temperature of the CPU in the old-type CPU cooler was about 100° C., while the CPU in the CPU cooler 24 was reduced to 90° C.

What is claimed is:
1. A cooler for an electronic unit, comprising:
   a heat sink having;
   a first portion which contacts with a heat generating body directly, or through a material having a heat conductivity coefficient of at least a predetermined value and a thickness of no more than a predetermined value;
   a fan;
   a second portion defining at least a portion of a fan disposing space said first and second portions are continuous to each other and spread substantially horizontally above said heat generating body and said fan;
   said fan being arranged in said fan disposing space and said fan has a plurality of blades which rotate with a vertical direction of said heat sink as its axis of rotation so that air introduced in said vertical direction is discharged in a radial direction as a horizontal direction;

said fan and said heat generating body being disposed side by side in a horizontal direction of said heat sink; and a heat pipe mounted on said heat sink so that it contacts with said heat generating body directly or through said material at said first portion, and it is exposed to said fan disposing space at said second portion, said heat pipe extending substantially horizontally along the bottom surface of said first and second portions;

wherein said second portion has a top surface lower than the top surface of said first portion; and said lower top surface has an inlet port communicating with said fan disposing space and also reaches at least one side surface of said heat sink.

2. A cooler for an electronic unit, comprising:

a heat sink having;

a first portion which contacts with a heat generating body directly, or through a material having a heat conductivity coefficient of at least a predetermined value and a thickness of no more than a predetermined value;

a fan;

a second portion defining at least a portion of a fan disposing space said first and second portions are continuous to each other and spread substantially horizontally above said heat generating body and said fan;

said fan being arranged in said fan disposing space and said fan has a plurality of blades which rotate with a vertical direction of said heat sink as its axis of rotation so that air introduced in said vertical direction is discharged in a radial direction as a horizontal direction;

said fan and said heat generating body being disposed side by side in a horizontal direction of said heat sink; and a heat pipe mounted on said heat sink so that it contacts with said heat generating body directly or through said material at said first portion, and it is exposed to said fan disposing space at said second portion, said heat pipe extending substantially horizontally along the bottom surface of said first and second portions;

wherein a bottom surface, on the side of said first portion, of said heat sink is covered with a high heat-conductive metal member comprising a material whose heat conductivity coefficient is greater than that of said heat sink; and said high heat-conductive metal member forms a fan-disposing-space bottom surface which defines said fan disposing space in cooperation with said second portion.

3. The cooler for an electronic unit according to claim 2, wherein a direction in which said first and second portions are continuous to each other is defined as a first horizontal direction and a horizontal direction perpendicular to said first horizontal direction is defined as a second horizontal direction;

said fan disposing space has a portion which projects from said fan in said second horizontal direction; and said heat pipe extends to said projecting portion.

4. The cooler for an electronic unit according to claim 3, wherein said heat pipe is formed into a flat shape in which a horizontal direction perpendicular to an extending direction thereof is a width direction.

5. The cooler for an electronic unit according to claim 4, wherein said heat pipe extends linearly.

6. The cooler for an electronic unit according to claim 5, wherein said fan disposing space has an exhaust port at its side portion opposite to said heat generating body through said fan; and said exhaust port has dimensions so that at least a portion of said fan within said fan disposing space is exposed to said exhaust port and that at least a portion of said projecting portion is exposed to said exhaust port.

7. The cooler for an electronic unit according to claim 2, wherein the fan-disposing-space bottom surface of said high heat-conductive metal member has a lower inlet port which communicates with said fan disposing space, right under said fan.

8. The cooler for an electronic unit according to claim 7, wherein said high heat-conductive metal member has a covering portion which spreads horizontally to cover said first portion, said fan-disposing-space bottom surface portion spreading horizontally at a position lower than said covering portion, and a hanging portion which extends vertically to connect said covering portion and said lower fan-disposing-space bottom surface portion together; and said hanging portion defines a side portion, on the side of said heat generating body, of said fan disposing space.

* * * * *